UNITED STATES PATENT OFFICE.

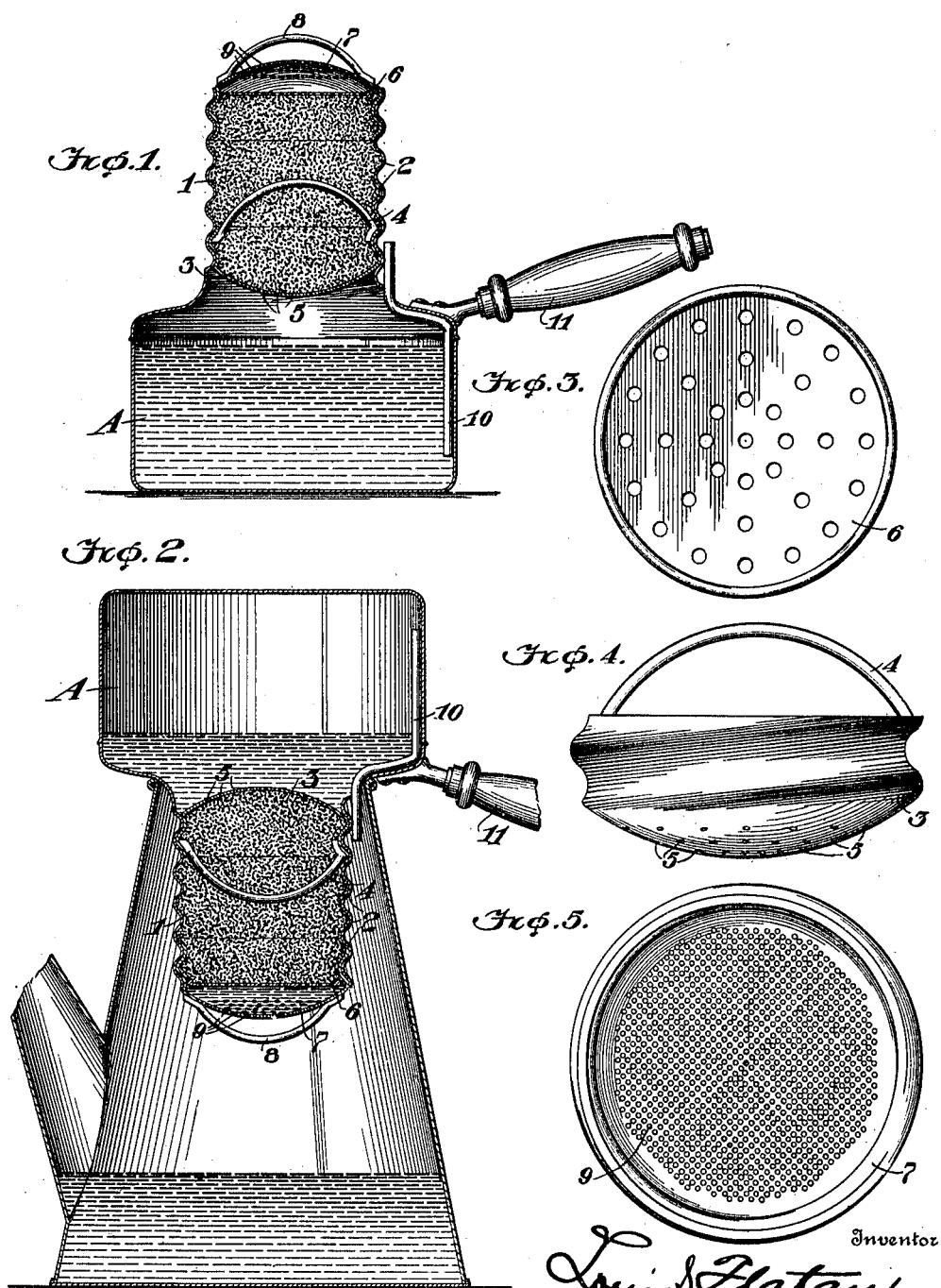

LOUIS S. FLATAU, OF ST. LOUIS, MISSOURI.

COFFEE-MAKER.

980,088.  Specification of Letters Patent.  Patented Dec. 27, 1910.

Application filed June 3, 1909. Serial No. 499,851.

*To all whom it may concern:*

Be it known that I, LOUIS S. FLATAU, a citizen of the United States, residing at St. Louis, in the State of Missouri, have invented certain new and useful Improvements in Coffee-Makers, of which the following is a specification.

My invention relates to an improvement in coffee makers, and the object is to provide a vessel or receptacle to be used in connection with a coffee pot after the water has been allowed to boil, and the coffee has been subjected to the steam which heats and softens the coffee, but without causing any odor from the coffee. After the water has boiled sufficiently, and the coffee has become heated and softened, the receptacle is placed over the coffee pot, and the water allowed to percolate through the coffee grounds into the coffee pot, thereby making drip coffee.

The invention consists in certain novel features of construction and combinations of parts which will be hereinafter described and pointed out in the claims.

In the accompanying drawings:—Figure 1 is a vertical sectional view through my improved coffee maker, Fig. 2 is a vertical sectional view showing the device applied to a coffee pot permitting the water from the receptacle of the maker to pass through the grounds of the coffee and into the coffee pot, Fig. 3 is a top plan view of the perforated disk, Fig. 4 is a side view of the tray which supports the coffee within the coffee maker or body, and Fig. 5 is a bottom view looking into the cover.

A, represents the vessel of the coffee maker which is provided with a long neck 1 which is threaded by forming spiral corrugations 2, therein. A tray 3 is screwed into the neck 1, the body portion or walls of which are spirally corrugated so that it can be easily inserted or removed from the neck by a handle 4, which is connected thereto. The tray is preferably made cup-shaped, and the bottom is perforated as at 5. The tray is adjustable within the neck, and is placed within the neck at the proper distance to receive the coffee grounds which are placed in the neck to be heated by the steam for softening the coffee before the percolation operation. After the grounds have been placed in the neck, a perforated disk 6 is placed in the neck directly over the coffee, then the cover 7 is inserted into the neck by screwing the cover therein. The walls or body of the cover are spirally corrugated so that it can be screwed into the neck by the handle 8 which is connected to the cover. The top of the cover is perforated at 9 to admit of the steam and water passing therethrough.

The disk 6, tray 5, and the cover 7 are all provided with perforations; while a wire netting of fine and coarse mesh might be used, I prefer to simply perforate the different members. The tube 10 is received in the vessel and extends nearly to the bottom thereof, the upper end of the tube projecting out through the vessel and extending along the neck 1, which acts as a means for permitting the steam to escape when the water is boiling, and when the vessel is inverted for the percolation operation. Thus the tube acts as an air-vent. A handle 11 is connected to the vessel for lifting and moving the vessel.

By the adjustment of the tray 3, the coffee is held between the confines of the cover and disk and tray against movement, that is to any great extent, and any quantity of coffee can be made by simply adjusting the tray within the neck of the vessel. This is considered very advantageous, and the fact that the cover and tray both screw into the neck, obviates any danger of the water during the percolating operation, passing along the sides of the neck without coming into direct contact with the coffee. Without the adjustable feature for confining the coffee against movement between the cover and tray, and providing a screw connection between the cover, tray, and neck, the water which might pass between the neck, tray and cover might pass through without coming in contact at all with the coffee, provided the coffee is not held tight between the cover and tray. This would especially happen when the vessel is being inverted for the percolation. After the water has boiled in the vessel A, sufficiently, and the coffee has become steamed and softened, the neck 1 is placed within the neck of the coffee pot B for making drip coffee. The water in the vessel A, will now pass through the perforations 5 in the tray 3, through the coffee, and through the disk 6 and cover 7.

The coffee maker can be made of any size and to suit the different requirements, and of course can be used for making boiled coffee, if desired, by placing the coffee and water together, and after it has boiled sufficiently, the vessel can be inverted, and the coffee strained through the tray strainer and neck into another pot, thereby straining the coffee thoroughly from all the grounds or dregs.

Another method of making coffee would be done by placing the tray 5 and strainer 6 into the neck and placing the coffee upon the strainer 6, pouring water over the coffee, permitting it to pass through into vessel A; and after the coffee is made, the disk and tray could be removed, and the coffee strained through the cover 7.

Of course, there might be other methods of making coffee with this device, and it is evident that more or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. A coffee maker comprising a vessel having an extended spirally corrugated neck, a perforated tray and a perforated top adapted to be removably screwed into and held in the neck, and a tube which extends from the interior of the vessel out alongside the neck in position to enter the coffee pot when the vessel is inverted and the neck thereof is inserted into the top of the coffee pot.

2. A coffee maker comprising a vessel having an extended spirally corrugated neck, and a tray and top similarly corrugated to screw into the top and bottom of the neck and held therein, said parts each having perforated heads and provided with handles to facilitate turning them in and out of the neck.

3. A coffee maker comprising a vessel having an extended screw-threaded neck, a screw-threaded tray provided with perforations adapted to be screwed into and held in the neck, said tray adapted to receive the coffee, a strainer disk mounted over the coffee, and a screw-threaded cover having perforations therein adapted to screw into and held in the neck whereby the coffee is confined between the tray, strainer and cover, said vessel adapted to be inverted to permit the water from the vessel to pass through the coffee for making drip coffee.

4. A coffee maker comprising a vessel having an extended screw-threaded neck, a screw-threaded perforated tray for supporting the coffee within the neck adapted to be screwed therein the required distance and held, and a screw-threaded perforated cover adapted to be screwed into and held in the neck.

In testimony whereof I affix my signature, in the presence of two witnesses.

LOUIS S. FLATAU.

Witnesses:
    JULIUS V. SANITZKI,
    E. OBERLE.